Nov. 24, 1942.  W. S. PERCIVAL  2,302,798

THERMIONIC VALVE AMPLIFIER

Filed April 20, 1940

INVENTOR
WILLIAM. SPENSER PERCIVA
BY
ATTORNEY

Patented Nov. 24, 1942

2,302,798

UNITED STATES PATENT OFFICE 2,302,798

THERMIONIC VALVE AMPLIFIER

William Spencer Percival, Ealing, London, England, assignor to Electric & Musical Industries Limited, Hayes, Middlesex, England, a company of Great Britain Application April 20, 1940, Serial No. 330,717
In Great Britain March 22, 1939

3 Claims. (Cl. 178—44)

The present invention relates to thermionic valve amplifiers and more particularly to such amplifiers when used in conjunction with sources of weak electrical signals.

As the thermionic valve is a voltage operated device, signals have to be applied to it as voltages and it is therefore usual to shunt the source of signals by an impedance across which voltages suitable for application to the input of a thermionic valve amplifier may be developed. Such impedances usually include a resistance component which itself generates weak unwanted signals, known as Johnson noise, due to the heat motion of electrons within it, and if the signal to be amplified is very weak, it may be of the same order as the unwanted signals due to said impedance, with the result that the signal to noise ratio is reduced in said input circuit.

If the source of signals is of high impedance, so that the signal current is substantially independent of impedance of its load, this undesirable reduction of signal to noise ratio may be minimised by increasing the value of the impedance of said load, for the signal voltage developed across said load will be directly proportional to the impedance of the load, whereas the mean square voltage due to Johnson noise in said load is proportional to the square root of its resistance. On the other hand, the use of a sufficiently high load impedance to give a satisfactory signal to noise ratio may cause serious attenuation of the higher frequency components of said signal due to the shunting effect of capacities associated with said input circuit which it may be difficult to compensate. A similar difficulty arises in the case of cables and the like which require to be terminated by impedances equal to their characteristic impedances in order to avoid reflection and consequent inequalities in frequency response, since the characteristic impedance is usually too low to enable the best signal to noise ratio to be obtained for weak signals.

A problem of a similar kind also arises when it is desired to damp a tuned circuit to which weak signals are fed. The use of a parallel damping impedance may give rise to noise due to the parallel shunt resistance component of such an impedance, and yet in the absence of such damping the properties of the circuit may vary so extensively over a band of frequencies in the neighbourhood of the resonant frequency that difficulty arises in their compensation.

It is an object of the present invention to provide an arrangement in which a source of weak signals is provided with a load impedance of a sufficiently high value to give a satisfactory signal to noise ratio and in which said impedance is effectively decreased to a lower value to reduce the above-mentioned disadvantages without substantially decreasing said signal to noise ratio.

According to one feature of the present invention, there is provided a circuit arrangement in which a source of weak electrical signals is connected to the input circuit of a thermionic valve amplifier and is shunted by a conductance to maintain a desired response curve over a range of frequencies wherein decrease in the signal to noise ratio of said signals due to said conductance is substantially avoided by effectively providing at least two thirds of said conductance by negative feedback from said output circuit to said input circuit.

Said feedback may be derived from the anode circuit or from the cathode circuit of said valve.

According to a further feature of the present invention there is provided a circuit arrangement in which a source of weak electrical signals having a wide frequency range is shunted by a high load resistance in the input circuit of a thermionic valve amplifier and in which in order to maintain a substantially uniform response over a desired frequency range, the conductance of said load is in operation effectively increased at least three times by effectively connecting the anode of said valve to a point in said resistance so as to provide negative feedback, whereby the signal to noise ratio of the signals in said output circuit is greater than it would have been had said increased conductance been provided without said feedback by shunting said source with a low load resistance.

According to another feature of the present invention there is provided a circuit arrangement in which a source of weak electrical signals which may vary over a range of frequency is connected to a circuit tuned to a frequency within said range in the input circuit of a thermionic valve amplifier in which in operation shunt damping is provided to reduce the change in the shunt resistance or phase change of said circuit within said frequency range wherein said damping is substantially wholly provided by connecting the anode of said thermionic valve through a resistance to the control electrode thereof so as to introduce negative feedback in operation whereby the signal/noise ratio of the signals in said output circuit is greater than it would have been had said damping been provided without said feedback by shunting said circuit with a resistance.

In order that the present invention may be clearly understood and readily carried into effect it will now be described with reference to the accompanying drawing which illustrates embodiments of the present invention by way of example and in which.

It is known that if the output circuit of a thermionic valve amplifier be coupled back to the input circuit thereof, the input conductance of the amplifier is effectively changed. By choice of the appropriate feedback circuit, the input conductance can be greatly increased, and I have found that a conductance obtained in this manner introduces less noise than a conductance of similar value in the form of an actual or physical shunt impedance. This appears to be due to the fact that in the former case the Johnson noise which would be introduced by the resistive component of the physical shunt impedance is avoided and although "shot" noise is generated in the anode circuit of the valve it is introduced into the signal after it has been amplified and consequently does not affect the signal/noise ratio so seriously as would the Johnson noise introduced into the signal before amplification as in the latter case. It will be appreciated that signal to noise ratio is unaffected by the negative feedback, as both signal and noise are reduced in the same ratio.

Figure 1:
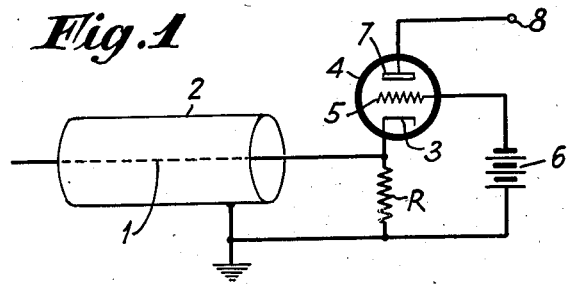
Figures 1 and 2 illustrate circuit arrangements for feeding signals from a cable to a triode valve.

Referring now to Figure 1, a cable having an inner conductor 1 and a concentric screen 2 is connected to the amplifying valve 4. It is to be assumed that the signals delivered to the input circuit of the valve 4 are so weak that the signal to noise ratio would be seriously diminished were the cable to be terminated by a physical impedance equal to the characteristic impedance of the cable due to the Johnson noise which would be generated in such an impedance. The desired terminating impedance for the cable is therefore introduced by means of negative feedback. The cable is connected in the cathode circuit of the valve 4 in such manner that the valve 4 terminates the cable with a conductance substantially equal to the mutual conductance of the valve 4 which is chosen to be equal to the inverse of the characteristic impedance of the cable. To obtain this result, the inner conductor 1 of the cable is connected to the cathode 3 of the valve 4, and the outer conductor 2 is earthed and connected to the grid 5 of the valve 4 through a source of bias voltage 6 which is chosen so as to enable the valve 4 to operate in a linear manner. The anode 7 of the valve 4 is connected at 8 to an output impedance (not shown) across which the amplified signal is developed and the other end of said output impedance is connected to a source of anode voltage (not shown), the negative pole of which is earthed. A relatively high resistance R may be connected between the cathode 3 of the valve 4 and earth to provide a path for the D. C. component of said valve, but, if a suitable path for the component is provided by the cable itself, the resistance R may be omitted, in which case the impedance shunting said cable in the absence of said feedback is substantially infinite.

It will be appreciated that by the use of the arrangement described above, the signal to noise ratio of the signals in the output circuit of said valve 4 is substantially equal to the ratio which would have been obtained had the cable been terminated by an impedance sufficiently high to give the best possible ratio, and at the same time the inequalities in frequency response which would have resulted from such a mismatched termination of the cable have been removed by effectively providing the cable with a "noiseless" terminating impedance equal to its characteristic impedance.

Figure 2:
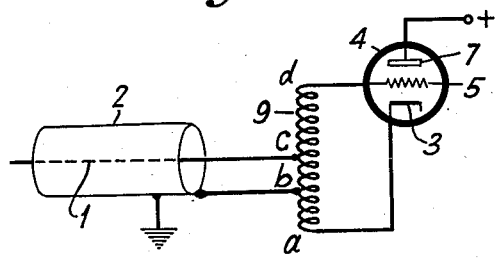

In the arrangement shown in Figure 2, corresponding elements are numbered as in Figure 1 and it will be observed that the two conductors 1, 2 of the cable are connected to tappings b, c upon an auto-transformer 9, the outer tappings d and a of which are connected to the grid 5 and the cathode 3 of the valve 4. This arrangement differs from that shown in Figure 1 only in that the cable is coupled to the input circuit of the valve 4 over a step-up transformer and is also coupled to the cathode circuit of this valve by means of a transformer. By adjustment of the ratios of these transformers, it is arranged that the cable is effectively shunted by a conductance equal to the reciprocal of its characteristic impedance due to the negative feedback, with the same advantage as in the case of the arrangement of Figure 1.

It is preferable to make the step-up ratio of the transformer, that is the ratio of the windings between the terminals $a$ and $d$ to the windings between the terminals $b$ and $c$ as high as possible consistent with the required band width. The number of turns between the tapping points $a$ and $b$ is then adjusted to provide the correct effective termination due to feedback. For a voltage difference V between the conductors 1 and 2 the current the valve is given by $Vg\ ad/cb$, where $g$ is the mutual conductance and $ad/cb$ the transformation ratio of the transformer 9 between the tapping points $a$ and $d$ and $c$ and $b$ respectively. The current to the cable is consequently $Vg\ ad.ab/cb^2$ where $ab/cd$ is the transformation ratio between the points $a$ and $b$ and $b$ and $c$ respectively of the transformer 9, and thus the effective impedance is given by $cb^2./ad.ab.g$ which is preferably matched to the cable impedance. If desired, the tapping points $c$ and $b$ may coincide, and the auto transformer 9 may also be replaced by a transformer having two or more windings.

Figure 3:
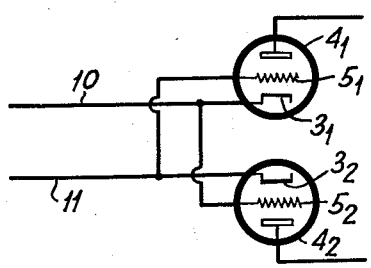
Figure 3 illustrates a circuit arrangement for feeding signals from a balanced cable to a pair of symmetrically arranged triode valves.

Turning now to Figure 3, there is shown a balanced cable having conductors 10 and 11 connected to two valves 4₁ and 4₂ arranged in push-pull. This arrangement is in principle the same as that of Figure 1 and each valve 4₁ and 4₂ operates to shunt the conductors 10 and 11 with a conductance equal to its own mutual conductance equal to its own mutual conductance, the sum of these conductances being arranged to be equal to the characteristic impedance of the said conductors. The output impedance may be connected in the output circuit of the valve 4₁ or the valve 4₂ or both of said valves. The negative pole of the anode voltage supply for the valves 4₁ and 4₂ is either returned to a centre tap in the source of signals at the remote end of the conductors 10 and 11 (not shown) or to a centre top on a relatively high resistance (not shown) shunting the conductors 10, 11 and corresponding to the resistance R of Figure 1.

It is to be noted in connection with the circuits illustrated in Figures 1, 2 and 3 that tetrode valves cannot conveniently be employed unless the screening electrode of such valves are either arranged so as to collect practically no current or else decoupled from the cathode. This is due to the fact that in tetrode valves noise originates in the screen electrode, which noise may be regarded as due to the random selection of electrons by the electrode, and if, as will be the case unless the aforementioned precautions are taken, this noise is not fed back to the output circuit, there results an undesirable increase in the noise to signal ratio.

Figure 4:
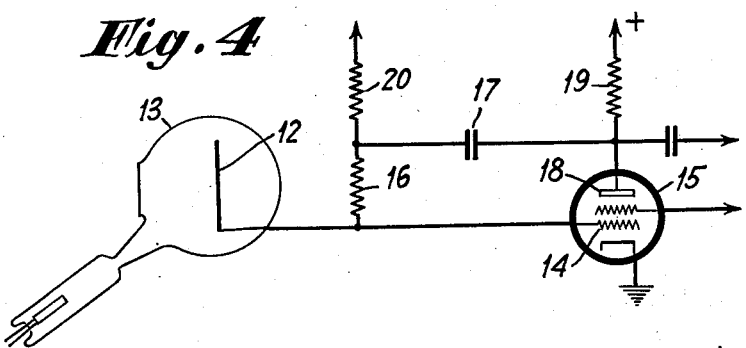
Figures 4 and 5 illustrate further circuit arrangements according to the present invention.
Figure 5:
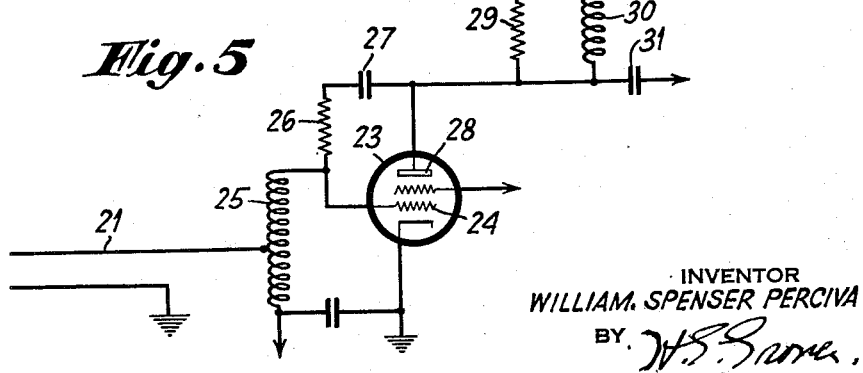

Figures 4 and 5 show alternative arrangements in which the desired high input conductance is obtained by negative feedback from the anode of the amplifying valve to its control electrode. In Figure 4 the output electrode 12 of a television transmitting tube 13 is connected to a load resistance 16, the resistance of which is high, and may be, for example, 300,000 ohms to give output signals having a good signal to noise ratio. This high value of load resistance would give rise to considerable attenuation of the higher frequencies of said signals due to the shunting effect of stray capacities, etc., associated with the input circuit of the first amplifying valve 15, and the conductance of the load impedance is therefore increased to a value, which may be equivalent to that which would be given by a shunt resistance of only 30,000 ohms, sufficient to preserve a uniform frequency response over a desired range of frequency by providing a feedback path from the anode 18 of the valve 15 through the condenser 17 to the upper end of the resistance 16. The output signals are developed across the resistance 19 in the anode circuit of the valve 15, and will not contain increased noise due to the provision of a high conductance in the input circuit of the valve. The grid 14 of the valve 15 is biassed suitably by a source of bias (not shown) connected to the upper end of the resistance 16 through the resistance 20.

The increase in the input conductance of the valve 15 due to feedback may be appreciated from the following considerations. Let it be supposed that the mutual conductance of the valve 15 and the resistance 19 are so chosen that a change of one volt positive on the grid 14 causes a change of nine volts negative at the anode 18. The condenser 17 may be assumed to be of relatively low impedance so that if the signal from the tube 13 is one volt positive, the feedback will apply a signal of nine volts negative to the upper end of the resistances 16, with the result that a total voltage of 10 volts is set up across the resistance, and a current equal to 10/300,000, namely, 1/30,000 amperes will flow through this resistance. The output electrode of the tube 13 therefore has to supply a current equal to 10 times that which it would have had to supply had there been no feedback, or, in other words, the load resistance 16 appears to the plate 12 to have increased its conductance ten times and to be equivalent to the conductance of a load resistance of only 30,000 ohms.

Much higher values of load resistance than 300,000 ohms, for example, several megohms, may be used with advantage to reduce microphonic and flicker noises generated by the tube 13, and by use of the feedback circuit shown, the effective conductance of the output circuit of the tube may be greatly reduced so as to improve the frequency characteristic. In order to preserve the desired phase opposition of the anode 18 and the grid 14 of the valve 15 over a wide range of frequencies, an inductance may be connected in series with the output resistance 19.

In Figure 5 there is shown an arrangement for terminating a cable with its characteristic impedance without the introduction of undesired noise. It will be observed that the feedback circuit is of the same kind as that shown in Figure 4, the anode 28 of the first amplifying valve 23 being connected through the condenser 27 and the resistance 26 to the grid 24 of this valve. The inner conductor 21 of a concentric cable is connected to a tapping on an auto transformer 25 connected to the control electrode 24, and the anode 28 is connected to an output impedance comprising the elements 29, 30 across which the output signals are developed, said output signals being fed out through the condenser 31.

If the value of the characteristic impedance of the feeder 21 is R, the step-up ratio given by the transformer 25 being equal to $n$, then the auto transformer 25 requires to be shunted by an effective impedance of $n^2R$, and if the amplification provided by the valve 23 is $m$, the value of the resistance 26 must then be approximately equal to $n^2(m+1)R$. Thus, the effective resistance terminating the feeder 21 is substantially equal to the characteristic impedance R and a substantially uniform frequency response is obtained, and as in the arrangement illustrated in Figure 4, the signal to noise ratio is not diminished by this termination. In Figure 5 the signals in the cable are assumed to be in the form of a modulated carrier, and the auto transformer 25 and the output inductance 30 are preferably tuned, if desired by their self-capacities, to the frequency of said carrier.

The arrangement shown in Figure 5 is also adapted to introduce damping into tuned circuits. If, for example, the source of signals is an aerial instead of the cable 21 and the auto transformer 25 is tuned to the frequency of the signal received in the aerial, undesirable phase changes and/or variations in the amplitude of the output signal are likely to arise if the frequency of the incoming signal varies or if the resonant frequency of the autotransformer varies. These effects may be overcome by damping the autotransformer, but if such damping be applied by connecting means such as a resistance in shunt with the auto transformer, noise will be introduced and the signal to noise ratio reduced. This undesirable reduction may, however, be avoided by introducing the required damping by means of negative feedback, the feedback circuit being of the kind shown in Figure 5 and therefore introducing a conductance in parallel with the tuned circuit.

It will be appreciated that in general the auto transformers which have been referred to in the examples of the invention described above may be replaced by transformers having two or more windings, and the term "transformer" as used in the appended claims is to be assumed to include an auto transformer. The term "amplifier" is also to be understood to refer generally to any arrangement in which the power of the signal is increased, and is not to be assumed to be limited to voltage amplifiers.

It will be understood that the invention is generally applicable in all cases in which it is desired to increase the shunt conductance across an input circuit without introducing noise which would adversely affect the signal to noise ratio. In order to obtain a substantial advantage from the use of the invention, however, considerable feedback must be used and the feedback must therefore be at least sufficient to increase the shunt conductance in the input circuit three times. It will be appreciated, however, that in general the greater the amount of feedback used, the better will be the signal to noise ratio.

I claim:

1. An amplifying system comprising a cable having a predetermined characteristic impedance, a thermionic amplifier tube, two-terminal negative feedback means including a transformer connected between said cable and said thermionic amplifier to terminate said cable in a conductance equal to the inverse value of said characteristic impedance.

2. An amplifying system comprising a source of signals having an output circuit with a predetermined characteristic impedance, a thermionic tube having a cathode, control electrode and an anode and having an input circuit of an impedance high relative to said characteristic impedance, a connection from said output circuit to said input circuit, and two-terminal negative feedback means including a transformer connected to said cathode to increase the effective conductance of said second named impedance by at least a factor of three.

3. An amplifying system comprising a source of signals having an output circuit with a predetermined characteristic impedance, a thermionic tube having a cathode, control electrode and an anode and having an input circuit of an impedance high relative to said characteristic impedance, a connection from said output circuit to said input circuit, and two-terminal negative feedback means including a transformer connected to said control electrode to increase the effective conductance of said second named impedance by at least a factor of three.

WILLIAM SPENCER PERCIVAL.